United States Patent [19]

Boyack et al.

[11] 4,385,152

[45] May 24, 1983

[54] ACRYLIC POLYMER EMULSION

[76] Inventors: Robert M. Boyack, 11 Jeffrey St., Mount Waverley, Victoria; Perry J. Cooke, 61 Dunbarton Dr., Wantirna, Victoria; Bruce C. Henshaw, 473 Waverley Rd., Mount Waverley, Victoria, all of Australia

[21] Appl. No.: 311,054

[22] Filed: Oct. 13, 1981

Related U.S. Application Data

[63] Continuation of Ser. No. 220,289, Dec. 29, 1980, abandoned, which is a continuation of Ser. No. 91,810, Nov. 6, 1979, abandoned.

[51] Int. Cl.$^3$ ............................................. C08F 265/06
[52] U.S. Cl. ..................................... 524/460; 524/504; 524/522; 525/301; 525/902
[58] Field of Search .............. 260/29.6 RB, 29.6 RW, 260/29.6 WB; 525/78, 221, 301, 902; 524/460

[56] References Cited

U.S. PATENT DOCUMENTS 3,401,134 9/1968 Fantl .................................. 260/29.6
3,458,603 7/1969 Griffin ............................... 260/29.6
3,787,522 1/1974 Dickie ............................... 260/29.6
3,985,703 10/1976 Ferry ................................. 260/29.6

*Primary Examiner*—Paul R. Michl
*Attorney, Agent, or Firm*—Irons & Sears

[57] ABSTRACT

Aqueous acrylic polymer emulsions containing as a first polymeric component a core-shell polymer having a core formed from one or more monomers selected from styrene, vinyl acetate, vinyl toluene and acrylic or methacrylic acid esters of alcohols of 1 to 4 carbon atoms and a shell formed of the above monomers in conjunction with one or more monomers selected from acrylic acid or methacrylic acid esters of alcohols of 1 to 8 carbon atoms and a minor amount of acrylic or methacrylic acid and as a second polymeric component a polymer composed of a major amount of one or more monomers selected from styrene, vinyl acetate, vinyl toluene and acrylic or methacrylic acid esters of alcohols of 1 to 4 carbon atoms and a minor portion of one or more acrylic acid esters of alcohols of 1 to 8 carbon atoms with acrylic and/or methacrylic acid.

4 Claims, 1 Drawing Figure

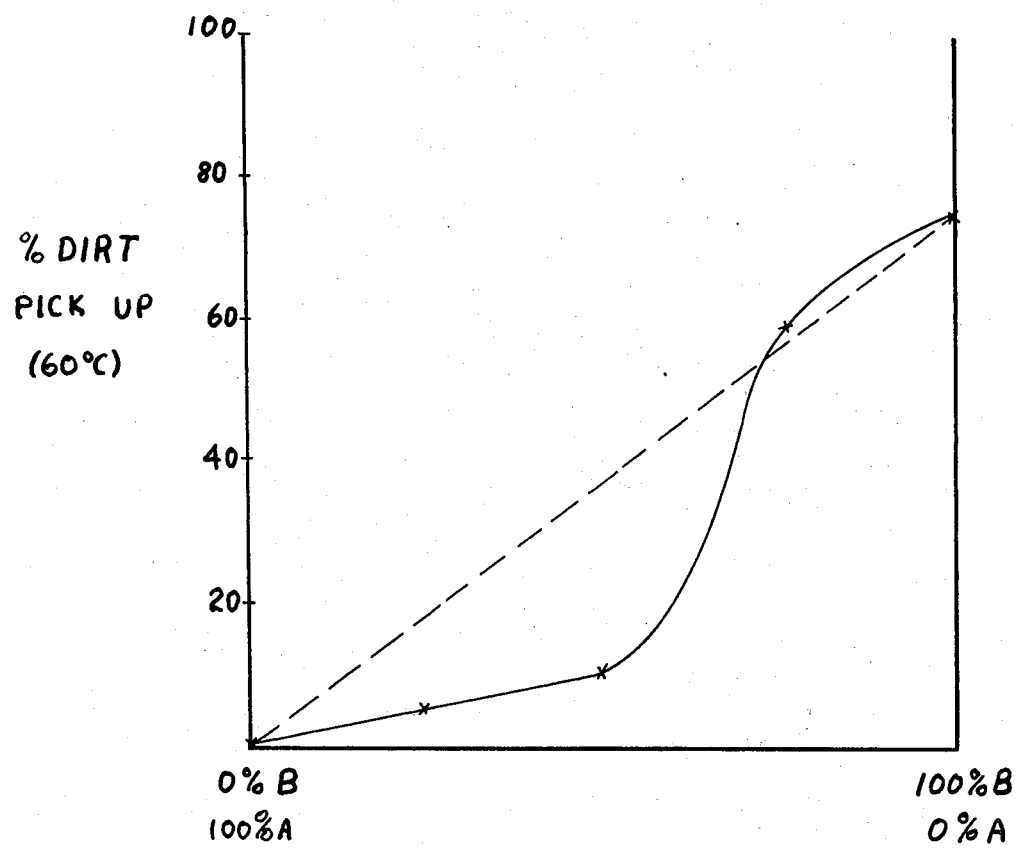

ACRYLIC POLYMER EMULSION

This application is a continuation of application Ser. No. 220,289, filed Dec. 29, 1980, abandoned, which in turn is a continuation of application No. 91,810 filed Nov. 6, 1979, abandoned.

FIELD OF THE INVENTION

This invention relates to acrylic polymer compositions and in particular to acrylic copolymer film forming emulsions which can be used as coating compositions for various substrates such as wood, metals and cementitious products.

Coating compositions for are generally expected to meet certain criteria. The coatings serve several purposes, for example, to enhance the appearance and protect the substrate (tiles etc.). The coatings may also be useful in manufacturing processes. For example, if the coating is applied to uncured cementitious products an improved final product is obtained. This improvement comes about because the water loss of the wet cementitious material is affected by the coating and results in a stronger cement product (e.g. tile) with better water resistance.

Emulsion coatings desirably have the following properties to enable them to be effective for coating uncured (wet) cementitious substrates (1) A low minimum film forming temperature (MFT) which enables the emulsion to be applied over a wide range of temperatures. MFT values below the application temperature are desirable.

(2) The film should preferably form a hard film which consequently has a good resistance to dirt pick up. This is an important characteristic because the coatings are usually applied on site where dust and dirt can quickly accumulate on wet cement surfaces.

(3) The film should show early resistance to the deleterious effect of water. With many acrylic films water resistance is not evident until virtually all of the water in the emulsion coating has evaporated.

(4) The film should be clear with the absence of air bubbles. This property is of importance in enhancing the appearance of the coated substrate.

(5) The coating should exhibit resistance of weathering. While the coating remains on the surface the product itself is protected and its serviceable life is increased.

PRIOR ART

In the prior art, it is extremely difficult to obtain a combination of the desirable film properties listed above from emulsions. For example, polymers that have low film forming temperatures tend to be soft and possess low resistance to dirt pick up. These polymers are usually manufactured by adding a mixture of acrylic and methacrylic ester monomers to a charge of water, surfactants (emulsifiers) and a polymerisation initiator such as potassium persulphate. The film forming properties of the polymers produced by these techniques may be varied by the choice of monomers, surfactants and the reaction parameters. These techniques however do not produce polymers with the desired end use properties.

Australian Pat. No. 463,892 discloses a solvent based cementitious coating composition incorporating a hydrophobic acrylic copolymer. This composition has proved to be effective but because of restrictions on the use of solvent based polymers on environmental/pollution grounds it is becoming a less desirable composition.

Thus the prior art developments, although recognising the desirability of emulsion coating compositions, could not provide a coating composition meeting all the desirable criteria mentioned above.

It is therefore an object of the invention to provide an emulsion film forming composition which is able to meet the desirable criteria in a more satisfactory way than the prior art.

BRIEF SUMMARY OF THE INVENTION

To this end the present invention provides an aqueous film forming emulsion consisting essentially of
(a) A polymer formed by first reacting a minor portion of
  (i) a monomer mixture comprising one or more monomers selected from styrene, vinyl acetate, vinyl toluene and acrylic or methacrylic acid esters of alcohols to 1 to 4 carbon atoms which monomers yield mono polymers having glass transition temperatures between 50° and 150° C. and subsequently adding to said first reaction mixture a major portion of
  (ii) a monomer mixture comprising a major amount of one or more monomers selected from styrene vinyl acetate, vinyl toluene and acrylic or methacrylic acid esters of alcohols of 1 to 4 carbon atoms and one or more monomers selected from acrylic acid or methacrylic acid esters of alcohols of 1 to 8 carbon atoms with a minor amount of acrylic acid and/or methacrylic acid; in admixture with
(b) a polymer composed of a major amount of one or more monomers selected from styrene, vinyl acetate, vinyl toluene and acrylic or methacrylic acid esters of alcohols of 1 to 4 carbon atoms and a minor portion of one or more acrylic acid esters of alcohols of 1 to 8 carbon atoms with acrylic and/or methacrylic acid.

The first polymer (a) of the emulsion is thought to be a core-shell polymer wherein the first reactants form a hard polymer core and the outer shell is a softer polymer formed by the subsequent reactants. Polymer (a) is a novel polymer. Polymer (b) is a prior art emulsion polymer which on its own is not particularly satisfactory.

DESCRIPTION OF THE PREFERRED EMBODIMENTS OF THE INVENTION

In an attempt to produce an improved polymer, a new polymerisation technique has been attempted. Initially hard polymer particles are formed (as in part (i) of (a) above) from methyl methacrylate and ethylene glycol dimethacrylate, then (as in (ii) of (a)) a mixture of methyl methacrylate, butyl acrylate and methacrylic acid were added to form polymers which would normally be expected to give soft films. It is believed that these polymers have particles possessing a hard core and a soft shell.

The monomers constituting the core are selected from readily available monomers that yield homo polymer "glass transition temperatures, Tg" between 50° C. and 150° C. Preferred monomers are methyl methacrylate and/or methyl acrylate with ethylene glycol dimethacrylate. The function of the ethylene glycol dimethacrylate is to immobilise the core. This function can be achieved by any other commercially available polyfunctional acrylates or methacrylates, e.g. diethylene glycol dimethacrylate, triethylene glycol dimethacrylate, propylene glycol dimethacrylate, trimethylolpropane trimethacrylate.

Divinyl benzene may also be used to immobilise the core.

The composition of the shell is governed by the minimum film forming temperature requirement. This is met by having a Tg around 2° C., preferably a range of −10° C. to 10° C.

A preferred composition contains methyl methacrylate, butyl acrylate and methacrylic acid.

The weight ratio of Shell:Core is desirably 75:25 but may be in the range 67:33 to 95:5. This ratio is also determined by the Tg of the components.

Besides the monomers specified above for the shell and core, many others may be employed e.g. styrene, methyl acrylate, ethyl acrylate, butyl methacrylate, ethyl hexyl acrylate, ethyl methacrylate, acrylic acid and vinyl toluene. These substitutions are governed by the Tg requirements as specified previously.

In the examples which follow the DPU % is calculated according to the following procedure.

A quantity of small pebbles is placed on the film which is then baked in order to soften the film. The softer the film is to start with, the softer it will be at elected temperatures, such that the pebbles will more readily adhere to the film. A standard film cast is tested concurrently.

APPARATUS:
  Glass plates
  ⅛" pebbles
  Doctor blade 0.006"

PROCEDURE:
1. A standard sample is to be run concurrently with the test sample.
2. Cast a film of the sample on a glass plate and place in the oven for 2 hours.
3. Take plate out of oven and allow to cool.
4. Place 5.0 g of ⅛" pebbles (or smaller) on the plate and spread out evenly.
5. Place the plate in the oven for 2 hours.
6. Take plate out of oven and allow to cool.
7. Tap the plate, held vertically, gently on a bench such that the loose stones fall off. Collect and weigh them.
8. Percentage dirt pick-up is calculated thus:

$(5.0 - W_7) \times 20$ $W_7$ is the weight of stones weighed in Procedure 7.

In the following examples the Persoz hardness is calculated using the following procedure.

METHOD:
1. Cast film on glass plate 4"×6" by standard technique.
2. The glass plate is placed on the support shelf and the box level laid on top. Horizontal alignment is then achieved with the help of the levelling screws.
3. After cleaning the spheres, the pendulum is placed in position on the lifting device and carefully lowered on to the sample slab and lifted again several times, until both spheres make contact simultaneously.
4. The pendulum correctly suspended is then gently lowered onto the sample plate and the pointer should be on zero. If it is not, check box level and if still not zero then shift the scale to read zero.
5. The pendulum is then swung, without jolting, to an angle of 6° (Konig) or 12° (Persoz) and held by the cable release.
6. Release pendulum and simultaneously start stop watch.
7. Always observe pendulum on one side of scale.
8. At the moment the swing of the pendulum is 3° or less (Konig) or 4° or less (Persoz) stop watch. The time in seconds is the value required.

A preferred polymer of type (a) can be made as follows:

EXAMPLE 1

| Charge the reaction vessel with | |
|---|---|
| Water | 469 parts |
| Empicol LS30E | 14.7 |
| (Sulphated fatty alcohol emulsifier) | |
| Teric N10 (a non ionic surfactant formed from NONYL phenol and about 10 moles of ethylene oxide) | 9.5 |
| Borax | 2.1 |
| Heat to 80° C. and add Potassium Persulphate | 1.527 parts |
| Feed over 1 hour: | |
| Methyl methacrylate | 95.3 |
| Ethylene glycol dimethacrylate | 4.7 |
| Then feed over 4 hours | |
| Methyl methacrylate | 186.2 |
| Butyl acrylate | 179.3 |
| Methacrylic acid | 4.3 |
| Then hold at 80° C. for two hours | |
| Cool and add | |
| Formalin | 1.2 |
| Ammonia (32%) | 4.0 |
| The film properties of Polymer (a) are as follows: | |
| MFT | 10° C. pass |
| DPU (60° C.) | 2.6% |
| Film | Hard, brittle |
| Persoz film hardness | 148 seconds |
| Early water resistance | Good. |

The MFT is higher than for most practical prior art emulsion polymers. The film is harder than prior art emulsion polymers but too brittle. On the other hand the resistance to dirt pickup is very good due to the hardness of the film. (This is surprising as the outer shell of the polymer particles contain "soft" polymers. Little is known about shell/core polymers).

The composition of the core and shell components may be varied as follows.

Core. One variation is to leave out the optional component which is usually ethylene glycol dimethacrylate. The methyl methacrylate content can be maintained at the same level or increased. The limit to the methyl methacrylate content is determined by the weight ratios of Core:Shell as defined above.

Another variation is to add a small quantity of acrylate ester as acrylates improve UV resistance. One example is the addition of 1.7 parts of methyl acrylate. On cost grounds it may be desirable to reduce the methyl methacrylate content by a similar amount but this is not essential.

Shell. Butyl acrylate may be replaced by ethyl acrylate provided the film from the revised monomer composition meets our Tg specification.

Acrlic acid may be used to replace methacrylic acid (on a molar basis).

Similarly to the core, there are dozens of combinations of monomers possible for the shell. Subject of course of the maintenance of the key requirements of Tg and
Shell:Core weight ratio.

Films formed from Polymer (a) tended to have bubbles present. Polymer (a) was also more corrosive than prior art emulsion polymers towards iron and steel. Attempts to reduce bubble formation and corrosiveness by the addition of a film coalescent aid such as TEXANOL were unsuccessful—the polymer coagulated. (TEXANOL is a film coalescent aid incorporating 2,2,4 trimethyl 1,3 pentane diolmono- isobutyl- rate).

In the preparation of polymer (a) the conditions set down in Example 1 may be varied where desired. For example any commonly used emulsion polymer catalyst may be substituted for potassium persulphate e.g. ammonium persulphate. The polymerization temperature range may be varied between 70° C. and 90° C. when using persulphate catalysts. If Redox catalyst systems are employed, the polymerization temperature can be lower, around 50° C. Also it is preferred that the first reaction be carried out for from ½ to 1½ hours and that the reaction of the second group of monomers occur over a 2 to 4 hour period. It will be clear to polymer chemists that the other minor additives such as emulsifiers can be selected from amongst those commonly available.

The polymer (b) of this invention is described in prior art.

A preferred polymer of type (b) is prepared as follows:

EXAMPLE 2

| Charge the reaction vessel with | |
|---|---|
| Water | 447 parts |
| Empicol LS30E (Sulphated fatty alcohol emulsifier) | 3.3 |
| Teric N10 (non ionic surfactant formed from nonyl phenol and about 10 moles of ethylene oxide) | 9.0 |
| Borax | 1.36 |
| Heat to 80° C. and add Potassium Persulphate | 1.75 |
| Feed over 5 hours | |
| Methyl methacrylate | 250 |
| Butyl acrylate | 114 |
| Ethyl acrylate | 45 |
| Acrylic acid | 6.6 |
| Then hold at 80° C. for 1.5 hours. Cool and add | |
| Ammonia (32%) | 4.26 |
| Water | 13.6 |
| Butyl Icinol | 13.6 |
| Texanol | 59.6 |
| Formalin | 1.36 |
| The film properties of Polymer (b) are as follows: | |
| Minimum film forming temperature | 0° C. |
| Dirt pick up (60° C.) | 65–75% |
| Film quality | Soft and flexible |
| Early water resistance | Good |
| Persoz film hardness | 87 seconds |

The MFT is good but the film is soft and readily picks up dirt.

In Polymer (b) butylacrylate may be replaced wholly by ethyl acrylate, provided the Tg of the copolymer is similar.

Texanol is a film coalescing aid. If a film coalescing aid is absent, the polymer films do not form properly and crack. In addition the coalescing aid helps to provide a clear film by the elimination of air bubbles and reduces corrosion to iron and steel.

Four further variations on the preparation of polymer (b) are given below.

EXAMPLE 3

| (a) Charge the reaction vessel with - | |
|---|---|
| Water | 49 kg |
| EMPICOL LS30E | 0.361 |
| TERIC N10 | 0.986 |
| Borax | 0.154 |
| (b) Heat to 80° C. and add | |
| Potassium persulphate | 0.190 |
| (c) Feed over 5 hours | |
| Methyl methacrylate | 29.0 |
| Butyl acrylate | 15.7 |
| Methacrylic acid | 0.50 |
| (d) Then hold at 80° C. for 1.5 hours Cool and add | |
| Texanol | 6.5 |
| Water | 1.1 |
| Butyl Icinol | 1.5 |
| Ammonia | 0.46 |

EXAMPLE 4

Following steps (a) and (b) of Example 3
(c) feed over 5 hours

| Methyl methacrylate | 29.0 |
|---|---|
| Butyl acrylate | 15.7 |
| Acrylic acid | 0.42 |

(d) as for Example 3.

EXAMPLE 5

Subsequent to steps (a) and (b) of Example 3
(c) feed over 5 hours

| Methyl methacrylate | 21.7 |
|---|---|
| Ethyl acrylate | 23.0 |
| Methacrylic acid | 0.5 |

(d) as for Example 3

EXAMPLE 6

Subsequent to steps (a) and (b) of Example 3
(c) feed over 5 hours

| Methyl methacrylate | 21.7 |
|---|---|
| Ethyl acrylate | 23.0 |
| Acrylic acid | 0.42 |

(d) as for Example 3

As explained above a preferred form of the present invention is a mixture of Polymer (a) and Polymer (b) preferably in a 1:1 weight ratio.

A mixture of Polymer (a) with Polymer (b) in a 1:1 weight proportion surprisingly possesses the following desired film properties.

| MFT | 6° C. pass |
|---|---|
| DPU (60° C.) | 4–8% |
| Film | Hard flexible |
| Persoz film hardness | 119 seconds |

-continued

| Early water resistance | Good. |

The dirt pickup (DPU) at 60° C. was measured on films formed from 1:3, 1:1, and 3:1 weigh ratios of Polymers (a) and (b) and compared with the DPUs of Polymers (a) and (b) by themselves.

|  | DPU (60° C.) % |
|---|---|
| Polymer (b) | 75 |
| b:a = 3:1 | 60 |
| b:a = 1:1 | 10 |
| b:a = 1:3 | 5 |
| Polymer (a) | 1 |

The attached graph shows quite clearly the unexpected benefit achieved by the 1:1 mixture. (The straight line on the graph shows the expected value of the DPU, on the assumption that the property is additive whereas the curved line illustrates the unexpected low DPU with the 1:1 blend). This graph shows that the best proportions of (a) to (b) are from 3:1 to 1:2 bearing in mind the other desirable properties.

These properties could not be predicted from the properties of the individual polymers constituting the mixture. As expected the early water resistance of the mixture was good. Similarly the MFT is midway between those of Polymers (a) and (b). On the other hand the film formed from the mixture was hard and flexible whereas the films of Polymers (b) and (a) were soft and flexible and hard and brittle respectively. More importantly, however, the poor resistance to dirt pick up of Polymer (b) has disappeared in the blend and the blends resistance to dirt pickup is almost as effective as that of Polymer (a). (One would have expected the dirt pick up characteristics of the blend to be only midway between those of Polymers (a) and (b)). Additionally, the incorporation of Polymer (b) and Polymer (a) surprisingly stopped bubble formation and reduced rusting as well as yielding more flexible films at low temperatures. Also the presence of Texanol in polymer (b) has surprisingly not affected polymer (b) or the stability of the blend.

The coatings of this invention are generally more durable than the solvent based coatings as described in Australian Pat. No. 463,892 because of the higher molecular weights of emulsion polymers. For example the molecular weights of the polymers of 463,892 are of the order of 70,000 whereas polymers (a) and (b) have molecular weights of the order of $4 \times 10^6$.

Although the emulsions of this invention have been described for use as cementitious coatings their application need not be so limited as they are applicable as coatings in many applications.

We claim:

1. A cementitious coating composition which forms a film at or below room temperature and which film has low dirt pickup properties comprising an aqueous film forming emulsion consisting essentially of
   (a) a polymer formed by first reacting a minor portion of
   (i) a monomer mixture comprising one or more monomers selected from acrylic or methacrylic acid esters of alcohols of 1 to 4 carbon atoms in conjunction with a minor amount of one or more monomers selected from divinyl benzene and acrylic or methacrylic acid esters of alcohols of 1 to 8 carbon atoms which monomer mixture yields a polymer having glass transition temperatures between 50° and 150° C. and subsequently adding to said first reaction mixture a major portion of
   (ii) a monomer mixture comprising a major amount of one of more monomers selected from acrylic or methacrylic acid esters of alcohols of 1 to 4 carbon atoms and one or more monomers selected from acrylic acid or methacrylic acid esters of alcohols of 1 to 8 carbon atoms with a minor amount of acrylic acid and/or methacrylic acid which monomer mixture yields a polymer having a glass transition temperature in the range of $-10°$ to 10° C.; in admixture with
   (b) a polymer formed by reacting a mixture of a major amount of one or more monomers selected from acrylic or methacrylic acid esters of alcohols of 1 to 4 carbon atoms and a minor portion of one or more acrylic acid esters of alcohols of 1 to 8 carbon atoms with acrylic and/or methacrylic acid, wherein the weight ratio of a (ii) to a (i) is within the range of 67:33 to 95:5 and the ratio of (a) to (b) is within the range of 3:1 to 1:2.

2. An emulsion according to claim 1 wherein polymer (a) comprises (i) a major amount of methyl methacrylate and a minor amount of ethylene glycol dimethacrylate and (ii) a major amount of methyl methacrylate and butylacrylate and a minor amount of methacrylic acid and polymer (b) comprises a major amount of methyl methacrylate and a minor amount of butylacrylate and methacrylic acid.

3. An emulsion according to claim 1 wherein polymer (a) and polymer (b) are present in equal weight proportions.

4. A method of treating cementitious substrates which comprises applying to wet uncured cementitious substrates a coating of an emulsion as defined in claim 1 and thereafter curing said coated substrate.

* * * * *

UNITED STATES PATENT AND TRADEMARK OFFICE
CERTIFICATE OF CORRECTION

PATENT NO. : 4,385,152

DATED : May 24, 1983

INVENTOR(S) : Robert M. Boyack, Perry J. Cooke and Bruce C. Henshaw

It is certified that error appears in the above-identified patent and that said Letters Patent is hereby corrected as shown below:

Column 1, line 45, for "resistance of weather-" read --resistance to weather- --;

Column 5, line 3, for "course of the" read -- course to the--.

Signed and Sealed this

Sixth Day of September 1983

[SEAL]

Attest:

Attesting Officer

GERALD J. MOSSINGHOFF

Commissioner of Patents and Trademarks